United States Patent [19]

Britzius

[11] 4,037,429
[45] July 26, 1977

[54] ADAPTER UNIT FOR CONVERTING A TWO-WHEEL DRIVE VEHICLE TO A FOUR-WHEEL DRIVE VEHICLE

[76] Inventor: George Edward Britzius, 4669 Olympia Way, Longview, Wash. 98632

[21] Appl. No.: 639,883

[22] Filed: Dec. 11, 1975

[51] Int. Cl.² .................... F16C 35/00; B60K 17/34
[52] U.S. Cl. .................................. 64/4; 180/1 R; 180/49; 180/70 R
[58] Field of Search ............ 180/44 R, 49, 1 R, 70 R; 64/4, 5, 6

[56] References Cited

U.S. PATENT DOCUMENTS

| | | | |
|---|---|---|---|
| 2,329,916 | 9/1943 | Lamb | 180/44 R |
| 2,850,920 | 9/1958 | Buckendale | 180/44 R X |
| 3,058,558 | 10/1962 | Hawk | 180/44 R |
| 3,095,758 | 7/1963 | Bixby | 180/44 R X |
| 3,335,580 | 8/1967 | Simpson | 64/4 X |
| 3,365,912 | 1/1968 | Seliber | 64/4 |
| 3,378,093 | 4/1968 | Hill | 180/44 R |

*Primary Examiner*—John P. Silverstrim
*Attorney, Agent, or Firm*—Seed, Berry, Vernon & Baynham

[57] ABSTRACT

An adapter unit is disclosed for connecting a power transfer unit to the transmission of a vehicle for conversion of a two-wheel drive vehicle to a four-wheel drive vehicle. The unit includes a housing adapted to be mounted on the transfer unit. The housing journals a drive shaft which is connected at one end to the transmission output shaft and at the other end to the transfer case input shaft.

4 Claims, 4 Drawing Figures

U.S. Patent        July 26, 1977        4,037,429
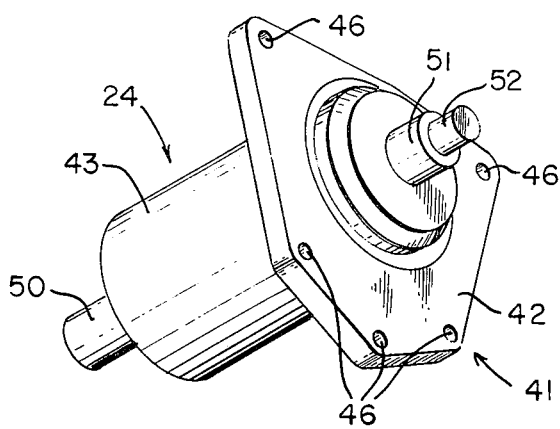
FIG. 1
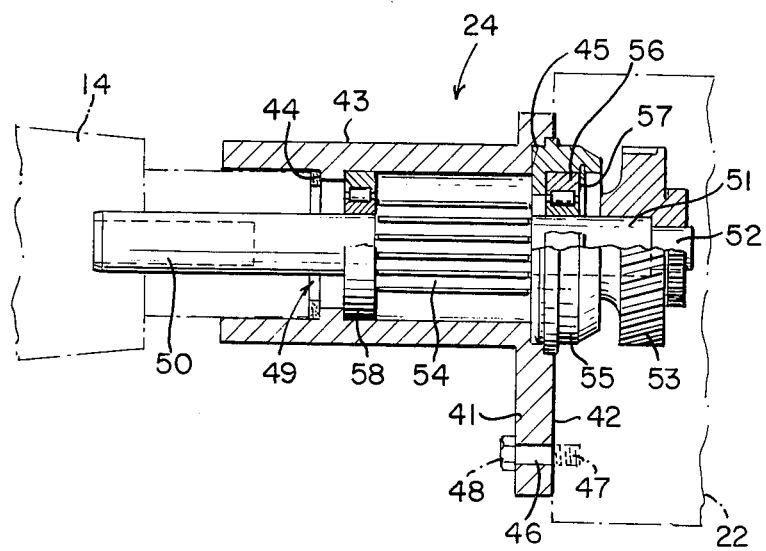
FIG. 2
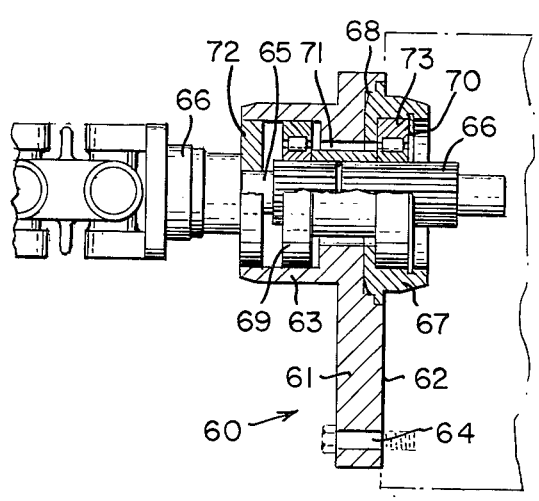
FIG. 3
FIG. 4

4,037,429

ADAPTER UNIT FOR CONVERTING A TWO-WHEEL DRIVE VEHICLE TO A FOUR-WHEEL DRIVE VEHICLE

BACKGROUND OF THE INVENTION

1. Field of the Invention

This invention relates to an adapter unit for converting a two-wheel driven vehicle to a four-wheel driven vehicle.

2. Prior Art Relating to the Disclosure

Two-wheel drive automotive vehicles, particularly import trucks and pickups, are being used increasingly for recreational use in rough, hilly areas. For negotiating such areas, it is desirable to have four-wheel drive capability as four-wheel drive vehicles are ideally suited for traveling off road over rough, hilly country. There is a need for an economical means for converting a conventional two-wheel drive system to a four-wheel drive system which is rugged and will withstand such off road driving conditions.

SUMMARY OF THE INVENTION

It is a primary object of this invention to provide means for adapting a conventional two-wheel drive system of an automotive vehicle to a four-wheel drive system without extensive change in the vehicle drive system.

It is a further object of this invention to provide an efficient, reliable, rugged and economic means of converting a two-wheel drive system for an automobile vehicle to a four-wheel drive system.

It is a further object of this invention to provide an adapter unit for import trucks such as the Datsun, Toyota pickups to convert them from a two-wheel drive system to a four-wheel drive system.

These objects are accomplished by employing an adapter unit connecting the power output shaft of the transmission of the vehicle with the input of the power transfer unit, the adapter unit having an adapter housing including an apertured, rigid adapter plate having a machined surface for attachment to the housing of the power transfer unit, an external sleeve portion integral with the adapter plate, a drive shaft coaxial with the external sleeve journaled on bearings held thereby and extending through the housing, one end of the shaft including means adapted to connect with the output shaft of the transmission of the vehicle and the other end of the shaft including means adapted to connect the shaft to the input of the power transfer unit, and means for connecting the adapter unit to the power transfer unit.

BRIEF DESCRIPTION OF THE DRAWINGS

FIG. 1 is a perspective view of the preferred adapter unit of this invention;

FIG. 2 is a vertical cross sectional view of the adapter unit of FIG. 1 illustrating the position of the adapter unit in relation to the transmission and transfer power unit of the vehicle;

FIG. 3 is a vertical cross sectional view of a modified adapter unit utilized in conjunction with a double U-joint; and FIG. 4 is a schematic of a vehicle drive system including the adapter unit of the type disclosed.

DETAILED DESCRIPTION OF THE INVENTION

FIG. 4 illustrates a schematic of a drive system of a typical vehicle having a frame 10. The conventional drive system for a two-wheel drive includes an engine 12 supported by the frame 10, a main transmission unit in a housing 14 operatively connected to the output shaft of the engine. The transmission output shaft is conventionally connected, through forward and rear universal joints 16 and a drive shaft 18 to a differential 19 which delivers power to the rear wheels 20. To convert the conventional two-wheel drive system to a four-wheel drive system, a geared power transfer unit 22 and an adapter unit 24 are required. The adapter unit connects the power output shaft of the transmission to the input of the power transfer unit 22. The power transfer unit 22 enables the operator of the vehicle to drive the forward wheels 26 of the vehicle through a forward differential 28, drive shaft 30 and universal joints 32 or drive the rear wheels through universal joints 16, drive shaft 18 and differential 19, or drive both the forward and rear wheels.

The power transfer unit 22 employed is a conventional and commercially available unit, such as a C18 or C20 unit manufactured by the Dana Corporation. The power transfer unit is housed in a suitable housing. Two power outputs extend from the housing, one delivering power to the drive shaft 18 leading to the rear wheels 20 and one delivering power to the drive shaft 30 leading to the forward wheels 26. Power input to the power transfer unit 22 is through an opening in the housing. The power transfer unit cannot be connected directly to the power output shaft of the transmission. It is the purpose of this invention to provide an adapter unit for connecting the power output shaft of the transmission of a conventional vehicle to a power transfer unit thereby making possible the conversion of the two-wheel drive vehicle to a four-wheel drive vehicle. The adapter unit must be rugged and capable of handling the stresses exerted on it.

The preferred adapter unit 24 is illustrated by FIGS. 1 and 2. The adapter unit comprises a housing including a rugged adapter plate 41 having a machined surface 42 for flush mounting of the adapter plate against the forward surface of the housing of the power transfer unit 22 and an integral hollow sleeve portion 43 extending between the housing of the transmission 14 and the housing of the power transfer unit 22 as illustrated in FIG. 2, when the adapter plate is bolted in place to the power transfer unit housing. The sleeve is generally cylindrical and includes an inner shoulder 44 extending around the inner circumference of the sleeve which serves as a retainer for a bearing as will be described. A recess 45 having a diameter approximately that of the outer diameter of the sleeve 43 is formed in the adapter plate to receive a bearing adapter. Openings 46 are drilled in the adapter plate 41 to coincide with threaded bores 47 on the forward face of the transfer unit housing 22. The openings receive a plurality of threaded bolts 48 to engage the threaded bores 47 so that the opening in sleeve 43 is coaxial with the standard drive shaft opening in the transfer unit housing 22.

A shaft 49 extends through and is coaxial with the sleeve 43. The forward end 50 of the shaft 49 has an internal spline portion which meshes with a splined portion on the power output shaft of the transmission for directly driving the shaft 49. The rear end 51 of the shaft includes a threaded portion 52 on which is keyed a bevel gear 53 adapted to mesh with the gears in the power transfer unit 22 for driving thereof. The shaft 49 includes an intermediate splined portion 54 which acts as a spacer between a bearing adapter 55 and bearing 58. The bearing adapter is friction fitted into the recess 45 in the face of the adapter plate 41 and extends beyond the plane of the adapter plate for tightly fitting against the opening in the power transfer unit 22 and in sealing relation thereto when the adapter plate is bolted in place. A bearing 56 is journaled on shaft 49 and supported by bearing adapter 55. A snap ring 57 holds bearing 56 in place. Bearing 58 is also journaled on shaft 49 and is supported by sleeve 43.

The disposition of the adapter unit is best shown in FIG. 2. The rear portion of the housing of the transmission slips into sleeve 43 and abuts the forward surface of flange 44. A silicone sealing compound of other sealing means are provided to seal the interface between the transmission housing and the adapter. The power output shaft of the transmission is directly keyed to the drive shaft 49 of the adapter unit by suitable means. The adapter unit is securely bolted to the power transfer unit housing. The bevel gear 53 on the rear end of power shaft 49 of the adapter unit engages the gears within the power transfer unit for driving thereof. The drive shaft 49 is in perfect alignment with the power output shaft of the transmission and is aligned such that the gear adequately meshes with the gears of the power transfer unit for adequate driving thereof.

To complete conversion of the conventional two-wheel drive system also requires replacing the front spindle of the vehicle with an axle including a differential 28 and connecting the differential to one of the power outputs of the power transfer unit for driving the forward wheels.

FIG. 3 illustrates a modified adapter unit 60 requiring a double universal joint extending between the power output shaft of the transmission of the vehicle and the adapter unit. This is not preferred because of vibration and wear problems. The adapter unit illustrated as FIG. 3 comprises a housing including an adapter plate 61 having a surface 62 designed to be flush mounted against the housing of the power transfer unit and an integral sleeve portion 63 extending a portion of the distance towards the output shaft of the transmission of the vehicle. The sleeve portion 63 is hollow and generally cylindrical. Openings 64 are drilled in the plate 61 to coincide with threaded bores in the front face of the power transfer unit housing. The openings receive a plurality of threaded bolts to engage the threaded bores so that the opening in sleeve 63 coincides with the standard drive shaft opening in the power transfer unit housing. A shaft 65 extends through and is coaxial with the sleeve 63. The forward end of the shaft is keyed to a connector 66 which is, in turn, secured to one end of a double universal joint. The other end of the universal joint is connected to the power output shaft of the transmission by suitable means. The rear end of the shaft is connected to a bevel gear (not shown) which extends into the housing of the power transfer unit and meshes with a gear or gears contained therein for driving thereof. The shaft 65 includes an intermediate portion 66 of larger diameter. A bearing adapter 67 is fitted into a recess 68 in the adapter plate and extends beyond the plane of the adapter plate 61. The bearing adapter tightly fits over the opening in the transfer unit housing for sealing the conversion unit to the housing of the power transfer unit. A rear bearing 73, journaled on shaft 65, is supported by the bearing adapter and retained in place by a snap ring 70. A forward bearing 69, also journaled on shaft 65, is held in spaced relation from the rear bearing 73 by a spacer plate 71. The adapter unit is sealed by a resilient, flexible seal 72 through which the shaft extends.

The adapter unit enables the owner of a two-wheel drive vehicle to convert it to a four-wheel drive vehicle at a minimum of expense and with the assurance that the vehicle will have the capability of negotiating rugged terrain without severe problems.

The embodiments of the invention in which a particular property or privilege is claimed are defined as follows:

1. An adapter unit for economically converting a two-wheel drive vehicle having a transmission output shaft driving the rear wheels of the vehicle to a four-wheel drive vehicle having a power transfer unit enclosed in a housing having an access opening to a power input shaft thereof for driving the rear, forward or both forward and rear wheels of the vehicle, the adapter unit coupling the transmission output shaft to the power input shaft of the power transfer unit and comprising:

a housing having a hollow sleeve portion integral with and connected to a rigid plate extending normal thereto, the plate having a machined surface adapted to be connected to said power transfer unit over said access opening, a drive shaft extending coaxially through said sleeve portion and including means on one end thereof adapted to drivingly engage said transfer unit input shaft and means on the other end thereof adapted to be in driven engagement with said transmission output shaft, at least one bearing supporting said drive shaft for rotation in said sleeve portion, a recess in said machined surface of the rigid plate coaxial with said sleeve portion, a bearing adapter mounted in the recess extending beyond the plane of the machined surface of the adapter plate to be received in the access opening of the power transfer unit, a bearing supported by said bearing adapter supporting said drive shaft of the adapter unit for rotation, and sealing means sealing the adapter unit against environmental damage.

2. The adapter unit of claim 1, wherein the means on said drive shaft adapted to be in driven engagement with said transmission output shaft includes a double universal joint.

3. The adpater unit of claim 1, wherein the transmission output shaft includes an external splined portion and said end of the drive shaft of said adapter unit adapted to be in driven engagement with said transmission output shaft includes an internal splined portion which meshes with said external splined portion of the transmission output shaft.

4. An adapter unit for economically converting a two-wheel drive vehicle having a transmission output shaft driving the rear wheels of the vehicle to a four-wheel drive vehicle having a power transfer unit enclosed in a housing having an access opening to a power input shaft thereof driving the rear, forward or both rear and forward wheels of the vehicle, the adapter unit coupling the transmission output shaft of the vehicle to the power input shaft of the transfer unit and comprising:

a housing having a hollow sleeve portion integral with and connected to a rigid plate extending normal thereto, the plate having a machined face adapted to be connected to said power transfer unit over said access opening, a drive shaft extending coaxially through said sleeve portion including means on one end thereof adapted to drivingly engage said transfer unit input shaft and means on the other end thereof adapted to be in driven engagement with said transmission output shaft, a recess in said machined face of said adapter plate coaxial with said sleeve portion, a bearing adapter supported in said recess and extending beyond the plane of the machined face of the adapter plate to be received in the access opening of the power transfer unit, a first bearing supported by the bearing adapter supporting the drive shaft of the adapter unit for rotation, a second bearing supported by the integral sleeve portion supporting the drive shaft of the adapter unit for rotation, a spacer separating the first and second bearings, and sealing means sealing the adapter unit against environmental damage.

* * * * *